United States Patent
Suzuki

(10) Patent No.: US 8,529,059 B2
(45) Date of Patent: Sep. 10, 2013

(54) METHOD OF MANUFACTURING EYEGLASS LENS

(75) Inventor: Tokio Suzuki, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 194 days.

(21) Appl. No.: 12/956,478

(22) Filed: Nov. 30, 2010

(65) Prior Publication Data

US 2011/0176104 A1    Jul. 21, 2011

(30) Foreign Application Priority Data

Nov. 30, 2009 (JP) ................................ 2009-271672
Nov. 30, 2009 (JP) ................................ 2009-271679

(51) Int. Cl.
    *G02C 7/00*         (2006.01)

(52) U.S. Cl.
    USPC ...................................................... 351/159.74

(58) Field of Classification Search
    USPC ........................ 351/159.73–159.77, 159.01
    See application file for complete search history.

(56) References Cited

U.S. PATENT DOCUMENTS

2005/0018131 A1 *    1/2005    Ishak .......................... 351/163

\* cited by examiner

*Primary Examiner* — James Greece
(74) *Attorney, Agent, or Firm* — Sughrue Mion, PLLC

(57) ABSTRACT

An aspect of the present invention relates to a method of manufacturing an eyeglass lens of multilayered structure having plural films including a polarizing film.

3 Claims, 8 Drawing Sheets

Fig. 2
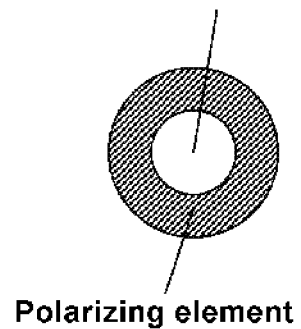
Empty hole or transparent film
Polarizing element
(a) Sectional view of filter
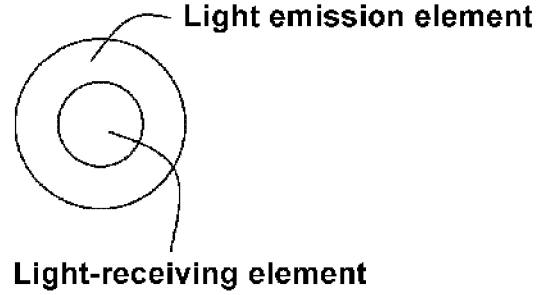
Light emission element
Light-receiving element
(b) Sectional view of the end portion of light emission and receiving element

METHOD OF MANUFACTURING EYEGLASS LENS

CROSS-REFERENCE TO RELATED APPLICATIONS

This application claims the benefit of priority under 35 USC 119 to Japanese Patent Application Nos. 2009-271672 and 2009-271679 filed on Nov. 30, 2009, which are expressly incorporated herein by reference in their entirety.

BACKGROUND OF THE INVENTION

1. Field of the Invention

The present invention relates to a method of measuring a thickness of a film contained in a laminate of multilayered structure, and more particularly, to a method of measuring by optical interferometry a thickness of a film contained in a laminate of multilayered structure comprising a polarizing film.

The present invention further relates to a method of manufacturing an eyeglass lens (polarizing lens) of multilayered structure having plural films comprising a polarizing film, and more particularly, to a method of manufacturing an eyeglass lens comprising a film of desired thickness by utilizing the above method of measuring a thickness of a film.

2. Discussion of the Background

Optical interferometry (also known as spectral ellipsometry) is widely employed to measure the thickness of individual layers contained in multilayered thin films. For example, Japanese Unexamined Patent Publication (KOKAI) Heisei No. 7-294220, which is expressly incorporated herein by reference in its entirety, proposes a method of determining the thickness of individual thin films by optical interferometry by irradiating a measurement sample in the form of a multilayered thin film with white light, dispersing the reflected light, and waveform processing the energy spectrum obtained by fast Fourier transformation of the spectrum thus obtained.

Generally, an eyeglass lens is fabricated by providing plural functional films on a lens substrate. One such functional film that is known is a polarizing film containing a dichroic dye. Eyeglass lenses comprising polarizing films are called polarizing lenses, and are employed as anti-glare glasses, for example, in industries such as the welding industry, in medical treatment, and in various sports such as skiing. Polarizing films are also employed in liquid-crystal displays and the like in addition to eyeglass lenses.

In polarizing films, the refractive index normally varies greatly with wavelength. This is because refractive index wavelength dispersion increases due to the effect of the absorption characteristics of the dichroic dye. As a result, for laminates containing polarizing films, it may be difficult to analyze the data when measuring the thickness of individual layers based on reflection spectra, and errors sometimes tend to occur in the measurement of film thickness. In some cases, it is difficult to calculate the film thickness of individual layers.

In eyeglass lenses having plural functional films, when the difference in the refractive indexes of the individual functional films is large, an interference fringe is sometimes produced, compromising optical characteristics. Thus, there are cases where it is desirable to reduce the difference in refractive indexes for visible light of the individual functional films. Accordingly, in eyeglass lenses (polarizing lenses) of multilayered structure that have been imparted with a polarizing property by providing a polarizing film on a lens substrate, for example, there are cases where the refractive index of an adjacent layer will be made close to the refractive index of the polarizing film.

On the other hand, in the measurement of film thickness by optical interferometry, the fact that various layers are distinct layers is identified and analyzed by differences in refractive index. Accordingly, when the difference between the refractive indexes of adjacent layers is small, the precision may decrease when identifying and analyzing individual layers as single layers, tending to result in measurement error. There are also cases where it becomes difficult to calculate the thickness of individual layers.

SUMMARY OF THE INVENTION

An aspect of the present invention provides for a means for precisely measuring by optical interferometry the thickness of a film contained in a laminate of multilayered structure comprising a polarizing film.

Polarizing films have the property of selectively transmitting/blocking polarization components in specific directions. The present inventor disposed a polarizing element between a laminate such as a polarizing lens, which comprised a polarizing film having the above property as one of plural films, and a light emission element emitting a measurement beam and/or a light-receiving element receiving reflected light, resulting in the discovery that the amplitude of the reflection spectrum could be changed. This was attributed to the following:

(1) Due to anisotropy of the polarizing film, even light of identical wavelength exhibited different refractive indexes for light with different oscillation directions (this characteristic is called the "birefringent characteristic"). Thus, when a polarizing element was disposed between the laminate and a light source to control the oscillation direction of the light irradiating the laminate (to select incident light oscillating in a specific direction), a change in refractive index was produced. This change in refractive index was thought to be the reason for the change in amplitude of the reflection spectrum when the polarizing element was disposed between the laminate and the light emission element.

(2) Additionally, regardless of whether the light used for illumination was omnidirectional light (also referred to as "natural light" or "randomly polarized light") or polarized light, the polarizing film exhibited multiple refractive indexes based on its birefringent characteristic. Accordingly, components with multiple refractive indexes were contained in the light that reflected from the polarizing film. When the polarizing element was disposed between the laminate and the light-receiving element and reflected light of specific oscillation direction was selected in the light reflected from the polarizing film, a change in refractive index resulted. This change in refractive index was thought to be the reason for the change in the amplitude of the reflection spectrum caused by disposing the polarizing element between the laminate and the light-receiving element.

Accordingly, the present inventor conducted extensive research based on this discovery, and discovered that the thickness of individual layers could be measured with high precision by optical interferometry by disposing a polarizing element so as to change the amplitude of the reflection spectrum relative to the amplitude of the reflection spectrum obtained in a state in which the polarizing element was not disposed. The present inventor surmises the following with regard to this point:

(A) The smaller the amplitude of the reflection spectrum obtained with the polarizing element disposed as compared to the amplitude of the reflection spectrum when the polarizing element was not disposed, the greater the mitigation of the effect of refractive index wavelength dispersion. This fact contributed to enhancing the precision of measurement of film thickness in laminates that, without the polarizing element, had considerable refractive index wavelength dispersion of the polarizing film and were difficult to analyze.

(B) The greater the amplitude of the reflection spectrum obtained with the polarizing element disposed relative to the amplitude of the reflection spectrum with the polarizing element not disposed, the easier it was to separate the reflection spectrum components of individual films. This fact contributed to enhancing the precision of film thickness measurement in laminates with small differences in refractive index between adjacent layers.

The present invention was devised based on the above knowledge.

An aspect of the present invention relates to a method of measuring a thickness of a film contained in a laminate of multilayered structure having plural films, comprising:

a reflection spectrum measuring step in which a reflection spectrum is obtained by irradiating the laminate with a measurement beam and receiving a light reflected from the laminate;

a film thickness calculating step in which the thickness of the film being measured is calculated based on the reflection spectrum obtained; wherein the laminate comprises a polarizing film as one of the plural films;

in the reflection spectrum measuring step, a polarizing element is disposed between an light emission element irradiating the measurement beam, and/or a light-receiving element receiving the reflected light, and the laminate; and the polarizing element is disposed so as to change an amplitude of the reflection spectrum obtained relative to an amplitude of a reflection spectrum obtained in a state where the polarizing element is not disposed.

The polarizing element may be disposed so as to decrease the amplitude of the reflection spectrum obtained relative to an amplitude of a reflection spectrum obtained in a state where the polarizing element is not disposed.

The polarizing element may be disposed so that a polarization axis of the polarizing element is roughly parallel to a polarization axis of the polarizing film.

As the measurement beam, visible light may be employed.

The polarizing element may be disposed so as to increase the amplitude of the reflection spectrum obtained relative to an amplitude of a reflection spectrum obtained in a state where the polarizing element is not disposed.

The polarizing element may disposed so that a polarization axis of the polarizing element is roughly orthogonal to a polarization axis of the polarizing film.

As the measurement beam, near infrared light may be employed.

Among films included in the plural films, a difference between a refractive index for omnidirectional light in a visible light region of the polarizing film and that of the film adjacent to the polarizing film may be equal to or less than 0.05.

A curve fitting method may be employed in the film thickness calculating step.

The polarizing film may comprise a dichroic dye.

The light emission element and light-receiving element may be disposed vertically above the laminate.

A further aspect of the present invention relates to a method of manufacturing an eyeglass lens of multilayered structure having plural films including a polarizing film, comprising:

after forming two or more layers of films comprising at least a polarizing film in a laminating step of forming the plural films, or after the laminating step, measuring a thickness of one or more of the films included in a laminate that has been formed by the above method of measuring a thickness of a film;

in case that the film thickness that has been measured falls outside a predetermined measurement range, conducting a film thickness adjusting step in which the film that has been formed is removed and a new film is formed, or the thickness of the film that has been formed is changed; and not conducting the film thickness adjusting step when the film thickness that has been measured falls within the predetermined reference range.

The present invention permits the highly reliable measurement of the thickness of various layers of films in a laminate of multilayered structure containing a polarizing film. On that basis, the present invention can provide an eyeglass lens having a functional film of desired thickness.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the figure, wherein:

FIG. 2(a) is a schematic sectional view of the filter shown in FIG. 1, and FIG. 2(b) is a schematic sectional view of the end portion of the light emission and receiving element shown in FIG. 1.

DETAILED DESCRIPTION OF THE EMBODIMENTS

Figure 1:
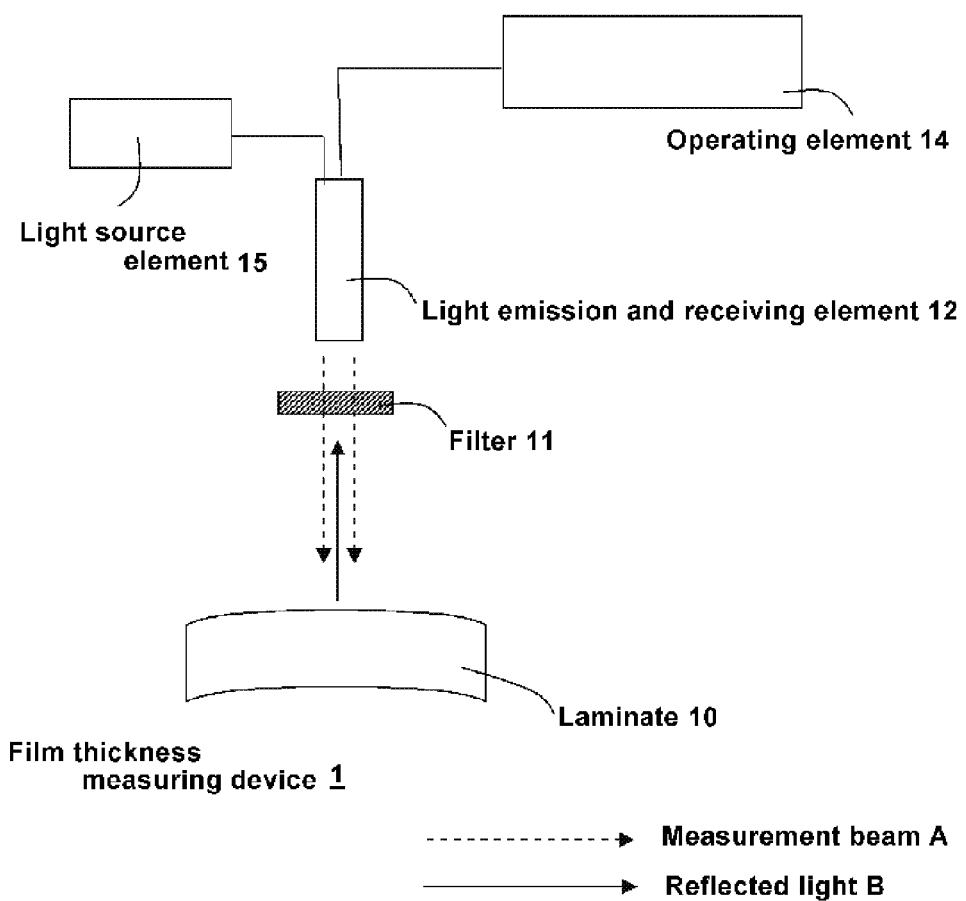
FIG. 1 is a schematic diagram of a film thickness measuring device permitting use of the measurement method of the present invention.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

An aspect of the present invention relates to a method of measuring a thickness of a film contained in a laminate of multilayered structure having plural films (referred to simply as a "film thickness measuring method" or "measuring method", hereinafter).

The film thickness measuring method of the present invention comprises a reflection spectrum measuring step in which a reflection spectrum is obtained by irradiating the laminate with a measurement beam and receiving a light reflected from the laminate; and a film thickness calculating step in which the thickness of the film being measured is calculated based on the reflection spectrum obtained. In the above method, the laminate comprises a polarizing film as one of the plural films; in the reflection spectrum measuring step, a polarizing element is disposed between an light emission element irradiating the measurement beam, and/or a light-receiving element receiving the reflected light, and the laminate; and the polarizing element is disposed so as to change an amplitude of the reflection spectrum obtained relative to an amplitude of a reflection spectrum obtained in a state where the polarizing element is not disposed.

The reason why disposing the polarizing element between the laminate containing the polarizing film and the light emission element and/or light-receiving element changes the amplitude of the reflection spectrum, and the reason why disposing the polarizing element in the above position so that the amplitude of the reflection spectrum changes relative to the amplitude of the reflection spectrum obtained when the polarizing element is not so disposed permits highly precise measurement of the thickness of individual film layers by optical interferometry are as set forth above.

The film thickness measuring method of the present invention will be described in greater detail below.

Figure 3:
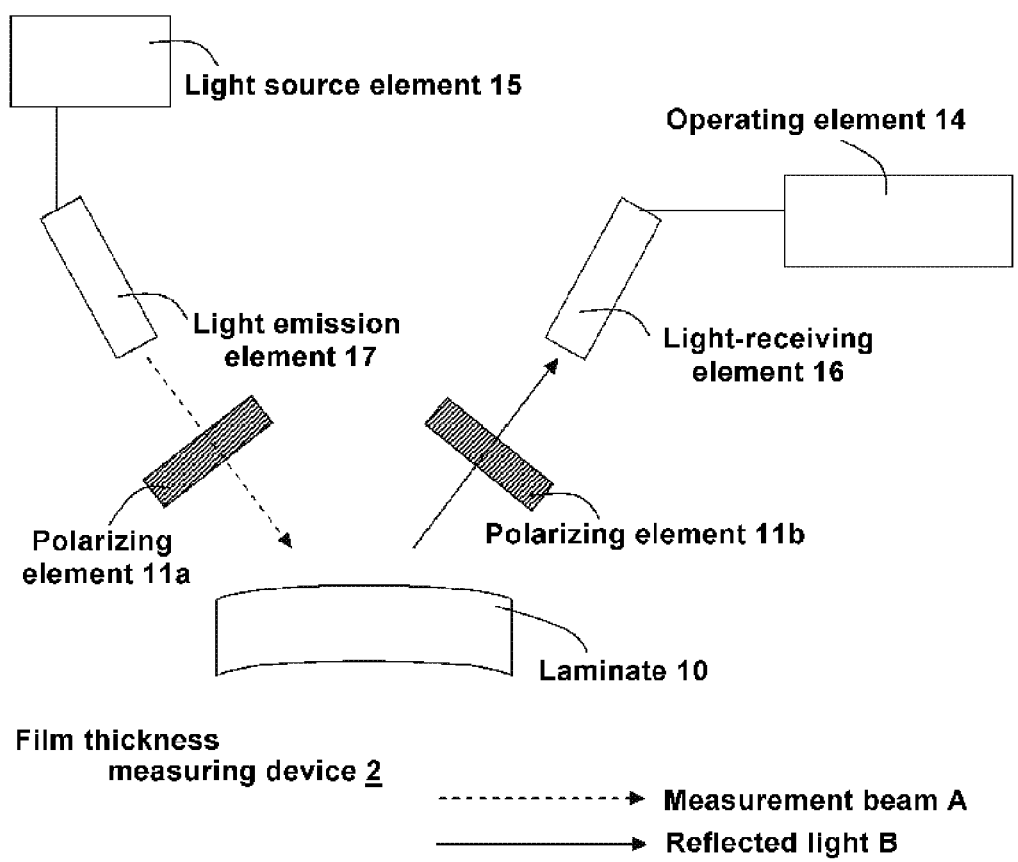
FIG. 3 is a schematic diagram of a film thickness measuring device permitting use of the measurement method of the present invention.

FIGS. 1 and 3 are schematic diagrams of a film thickness measuring device permitting use of the measuring method of the present invention.

In the film thickness measuring device 1 shown in FIG. 1, a light emission and receiving element 12, in which a light emission element and a light-receiving element are integrated, that is linked to a light source element 15 and an operating element 14 is disposed vertically above a laminate 10. Light (measurement beam A) that is irradiated vertically (angle of incidence $\theta=0°$) from light emission and receiving element 12 toward the laminate passes through a filter 11 and is then reflected off the laminate. Reflected light B passes through a filter 11 and is received by light emission and receiving element 12. As one embodiment of filter 11, a filter in which the portion through which the reflected light passes is an empty hole or a transparent film so that just the measurement beam passes through the polarizing element can be employed. FIG. 2(a) shows a schematic sectional view of such a filter. However, filter 11 is not limited to the embodiment shown in FIG. 2(a). The portion through which the measurement beam passes can be made an empty hole or a transparent film and the portion through which the reflected light passes can be a polarizing element. A configuration in which the entire surface is comprised of a polarizing element, with both the measurement beam and reflected light passing through the polarizing element, is also possible. In the device shown in FIG. 1, light emission and receiving element 12 can be comprised on the outside by a light emission element that irradiates a measurement beam and on the inside by a light-receiving element that receives light, as shown in the schematic sectional view of the end portion in FIG. 2(b). The light emission element can have at least one spot, and desirably has multiple spots disposed at regular intervals. The diameter of each spot is desirably about 0.5 to 1.5 mm from the perspective of making it possible to obtain an adequate quantity of reflected light.

The device shown in FIG. 1 irradiates the laminate with a measurement beam at an angle of incidence $\theta=0°$. In the measurement method of the present invention, the angle of incidence $\theta$ of the measurement beam is not limited to 0°. For example, it can be about 0.1 to 60°, and is desirably about 5 to 10°. FIG. 3 shows an example of a measuring device that is capable of radiating a measurement beam at such an angle of incidence.

In the film thickness measuring device shown in FIG. 3, measurement beam A is irradiated from light emission element 17 linked to light source element 15, and light B reflected from the laminate is received by light-receiving element 16 linked to operating element 14. In the device shown in FIG. 3, measurement beam A passes through polarizing element 11a and reflected light B passes through polarizing element 11b. However, it suffices to dispose at least one of these polarizing elements; it is not necessary to dispose both polarizing elements 11a and 11b.

As set forth above, the measuring method of the present invention comprises a reflection spectrum measuring step and a film thickness calculating step. Each of these steps will be sequentially described below.

Reflection Spectrum Measuring Step

In this step, a measurement beam is irradiated onto the laminate containing the film of which the thickness is to be measured, and the light reflected from the laminate is received to obtain a reflection spectrum. The above measurement beam is a compound beam containing multiple monochromatic beams, and is desirably a compound beam comprising continuous wavelength bands in a prescribed wavelength region. For example, the above wavelength region can comprise the near infrared region (about 1,000 to 1,600 nm) or the visible light region (about 360 to 830 nm).

The reflected light that is received by the light-receiving element is transmitted to the operating element to obtain a reflection spectrum. The light-receiving element can be linked to the operating element via known transmission means such as a signal line, an optical fiber and the like, or the configuration in which optical information is transmitted via an optical system such as a mirror, a lens and the like is also possible. The operating element can comprise a spectroscope, a means for calculating reflectance or intensity, and a means for calculating film thickness. FIGS. 1 and 3 show the embodiments in which the light-receiving element and the operating element are separately configured, but these element can be integrated. In addition, the spectroscope can be included in the operating element, as described above, and can be integrated with the light-receiving element, or can also serve as a light-receiving element. Alternatively, the spectroscope and the polarizing element can be integrated.

The reflected light is dispersed into individual wavelengths by the spectroscope. The reflectance or intensity calculating means calculates the reflectance or intensity of each wavelength, yielding a reflection spectrum indicating the reflectance or intensity at each wavelength. The reflection spectrum is desirably a spectral reflectance spectrum when curve fitting is employed as the operation process, and desirably a power spectrum when fast Fourier transformation is employed as the operation process.

Figure 4:
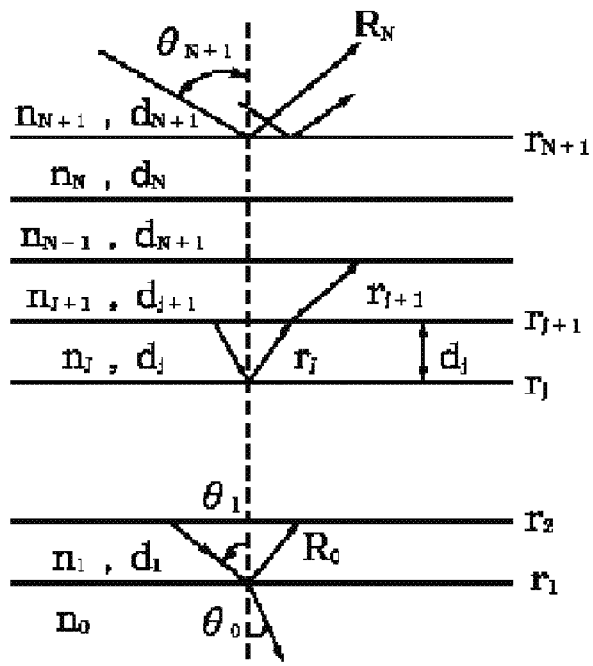
FIG. 4 is a drawing descriptive of the principle of measuring the thickness of individual film layers in a laminate of multilayered structure.

The relational expression giving the reflectance of a multilayer film system is widely known in the art. For example, in the laminate of multilayered structure shown in FIG. 4, the amplitude reflectance $R_j$ of the film of the $j^{th}$ layer is given by equation (1) below.

$$R_j = \frac{r_{j+1} + R_{j-1} e^{-2i\delta j}}{1 + r_{j+1} \cdot R_{j-1} e^{-2i\delta j}}, R_0 = r_1 \quad (1)$$

In equation (1), nj: the refractive index of the $j^{th}$ layer; dj: the thickness of the $j^{th}$ film; θj: the angle of incidence of the $j^{th}$ layer; rj: the Fresnel coefficient of the $j^{th}$ layer; and δj: $(2\pi/\lambda)$nj dj cos θj. When absorption by individual layers is ignored, the overall amplitude reflectance R can be approximated by equation (2) below.

$$R \approx r_1 + r_2 \exp(-2i\delta_1) + r_3 \exp\{-2i(\delta_1 + \delta_2)\} + \ldots + r_{N+1} \exp\{-2i(\delta_1 + \delta_2 + \ldots + \delta_N)\} \quad (2)$$

That is, refractive index information and film thickness information about each layer are contained in the light reflected from the laminate of multilayered structure. Thus, by means of various operational processing, it is possible to separate the reflection spectrum into the components of each layer and obtain the thickness of each layer from the spectral information that is separated.

However, in a laminate containing a polarizing film, the difference in refractive index based on wavelength is sometimes great in the polarizing film, so there are cases where it is difficult to analyze the data when measuring the thickness of individual layers from reflection spectra. This causes measurement errors, and sometimes makes it impossible to calculate the thickness of the individual layers. Accordingly, in one embodiment of the measuring method of the present invention ("Embodiment 1" hereinafter), a polarizing element is disposed between the laminate, the light emission element and/or the light-receiving element so that the amplitude of the reflection spectrum decreases relative to the amplitude of the reflection spectrum in a state where the polarizing element is not so disposed. As set forth above, the reason why the use of a polarizing element changes the amplitude of the reflection spectrum is thought to relate to the anisotropy (birefringence characteristic) of the polarizing element. In Embodiment 1, it suffices to dispose the polarizing element so that a reflection spectrum of lower amplitude than the amplitude of the reflection spectrum obtained in a state where the polarizing element is not so disposed is obtained. As indicated in Examples described further below, disposing the polarizing element so that its polarization axis is roughly parallel to the polarization axis of the polarizing film can minimize the amplitude of the reflection spectrum. Accordingly, in Embodiment 1, it is desirable for the polarization axis of the polarizing element to be roughly parallel to the polarization axis of the polarizing film. In the present invention, the term "roughly" as applied to angles includes a difference of ±5°.

In Embodiment 1, in order to reduce the effect on the analysis of wavelength dispersion of the refractive index of the polarizing film, the polarizing element is disposed to reduce the amplitude of the reflection spectrum. However, as set forth above, in film thickness measurement by optical interferometry, when the difference in refractive index with the adjacent layer is small, the precision when identifying and analyzing the various layers as single layers may decrease, tending to generate measurement errors. Accordingly, to reduce measurement error in Embodiment 1, the difference in the refractive index of the layer adjacent to the laminate being measured is desirably equal to or greater than 0.1 as a refractive index difference for omnidirectional light in the visible light range.

On the other hand, the smaller the amplitude of the reflection spectrum, the greater the error when separating out the components of the various layers from the reflection spectrum. This error may cause the calculated film thickness to greatly diverge from the actual measurement value when the difference in refractive index with the adjacent layer is small. Further, when the difference in refractive index between adjacent layers is small, there are cases where the various layers cannot be identified as single layers as set forth above, sometimes precluding film thickness measurement. Accordingly, in another embodiment of the measuring method of the present invention ("Embodiment 2" hereinafter), a polarizing element is disposed between the laminate and the light emission element and/or light-receiving element so that the amplitude of the reflection spectrum increases relative to the amplitude of the reflection spectrum obtained in a state where the polarizing element is not so disposed. In Embodiment 2, it suffices to dispose the polarizing element, as set forth above, so that a reflection spectrum with a larger amplitude than the amplitude of the reflection spectrum obtained when the polarizing element is not so disposed is obtained. As indicated in Examples further below, the amplitude of the reflection spectrum can be maximized by disposing the polarizing element so that the polarization axis thereof is roughly orthogonal to the polarization axis of the polarizing film contained in the laminate. Accordingly, in Embodiment 2, the polarization axis of the polarizing element is desirably made roughly orthogonal to the polarization axis of the polarizing film. An example of a laminate suitable for the application of Embodiment 2 is one in which the difference in refractive index for omnidirectional light in the visible light range between the polarizing film and the film adjacent to the polarizing film is equal to or less than 0.05.

In the measuring method of the present invention, the positioning of the polarizing element relative to the laminate can be determined based on the known positions of the polarization axes of the polarizing film and the polarizing element. Further, using a measurement device having a holding member (not shown in FIGS. 1 and 3) that is capable of holding the polarizing element and/or laminate in rotatable fashion, once the polarizing element has been mounted, the polarizing element can be rotated relative to the polarizing film so that the amplitude of the reflection spectrum changes relative to when the polarizing element is absent, and/or the position of the laminate can be adjusted. The latter method is suitable when the position of the polarization axis of the polarizing element and/or the polarizing film have not been determined in advance.

As shown in equation (3) below, the energy reflectance R of light reflected from a substance positioned in air contains variables in the form of the refractive index n and the attenuation coefficient k.

$$R = \frac{(n-1)^2 + k^2}{(n+1)^2 + k^2} \quad (3)$$

The attenuation coefficient k is related by $\mu = 4\pi k/\lambda$ with the absorption coefficient $\mu$ at a wavelength $\lambda$ nm, and increases with absorption. In equation (2) above, the absorption of the individual layers is ignored. However, k becomes substantial when the absorption increases, and ignoring the absorption leads to large measurement errors. Accordingly, in order to increase measurement precision in the above embodiments, and in order to reduce the measurement error incurred by ignoring k, it is desirable to conduct measurement in a wavelength region where there is little absorption. From this perspective, light in the near infrared region is desirably employed as the measurement beam in the present invention. However, even when light in the visible range is employed as the measurement beam in Embodiment 1, it is still possible to reduce the effect on the measurement value of the absorption characteristics of the dye by reducing the amplitude of the reflection spectrum as set forth above. Thus, use of light in the visible region as the measurement beam is also suitable.

Film Thickness Calculating Step

In this step, the reflection spectrum that is obtained in the reflection spectrum measuring step, which has a different amplitude than that obtained in the absence of the polarizing element, is employed to calculate the thickness of the film to be measured. Specifically, the film thickness can be calculated by the film thickness calculating means of the operating element by subjecting the reflection spectrum obtained to various operational processes. From the perspective of measurement precision, the operational processes that are employed here are desirably fast Fourier transformation and curve fitting, with curve fitting being preferred. For details concerning film thickness calculation by fast Fourier transformation, reference can be made to paragraphs [0025] to [0032] in Japanese Unexamined Patent Publication (KOKAI) Heisei No. 7-294220, for example. For details concerning curve fitting methods, reference can be made to paragraphs [0079] to [0086] in Japanese Unexamined Patent Publication (KOKAI) No. 2003-114107, for example. The contents of the above applications are expressly incorporated herein by reference in their entirety.

The measuring method of the present invention as set forth above makes it possible to reduce measurement error during film thickness measurement by optical interferometry in a laminate containing a polarizing film as one of plural films, such as a polarizing lens, thereby permitting highly precise measurement of the thickness of each layer. As stated above, in Embodiment 1, reducing the effect on analysis of the refractive index wavelength dispersion of the polarizing film can enhance measurement precision. Embodiment 2 can facilitate the separation of the components of individual layers from the reflection spectrum even in a laminate with little difference in refractive index between the polarizing film and adjacent layers, such as in a polarizing lens containing a polarizing film in which the difference in refractive index with an adjacent layer has been reduced to prevent an interference fringe. Thus, optical interferometry can be used to measure the thickness of the individual layers with high precision.

The present invention can also provide a film thickness measuring device that is employed in the film thickness measuring method of the present invention and is comprised of:

a light emission element that irradiates a measurement beam onto the laminate;

a light-receiving element that receives light reflected from the laminate;

an operating element that conducts a film thickness calculating step; and a holding member that is capable of holding in rotatable fashion the polarizing element and/or the laminate. The details are as set forth above.

A laminate suitable for the application of the measuring method of the present invention will be described next.

Figure 5:
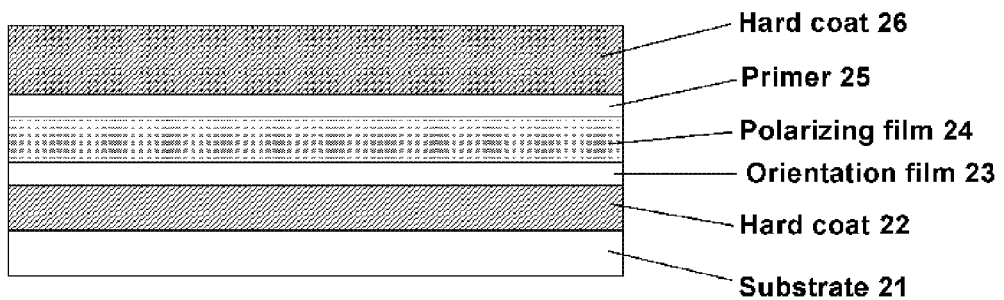
FIG. 5 is an example of the layer structure of a polarizing lens.

The measuring method of the present invention is suitable as a method for measuring the thickness of films on an eyeglass lens (polarizing lens) of multilayered structure having plural films including a polarizing film, as set forth above. FIG. 5 shows an example of the layer structure of a polarizing lens. In the polarizing lens shown in FIG. 5, on a lens substrate 21 are sequentially present a hard coat 22, an orientation film 23, a polarizing film 24, a primer 25, and a hard coat 26.

Lens substrate 21 is not specifically limited; examples are plastic and inorganic glass. Examples of plastics are methyl methacrylate homopolymer, copolymers of methyl methacrylate and one or more other monomers, diethylene glycol bisallyl carbonate homopolymer, copolymers of diethylene glycol bisallyl carbonate and one or more other monomers, sulfur-containing copolymers, halogen copolymers, polycarbonates, polystyrenes, polyvinyl chloride, unsaturated polyester, polyethylene terephthalate, polyurethanes, polythiourethanes, polymers made from materials including epithio group-containing compounds, homopolymers of monomers having sulfide bonds, copolymers of a sulfide and one or more other monomers, copolymers of a polysulfide and one or more other monomers, and copolymers of a polydisulfide and one or more other monomers.

The shape of the polarizing lens and the lens substrate are not specifically limited. The irradiated surface reflecting the measurement beam can be of any shape, such as planar, convex, and concave.

Hard coats 22 and 26 are not specifically limited. A film in the form of a microparticulate metal oxide added to an organic silicon compound is suitable. An acrylic compound can be employed instead of an organic silicon compound. The refractive index of the hard coat can be adjusted by means of the type and quantity of the microparticulate metal oxide. A known UV-curable resin or EB-curable resin such as an acrylate monomer or oligomer can be employed as the coating composition for forming the hard coat.

Primer 25 is an adhesive layer for enhancing adhesion. Examples are coating films formed by coating olefin-based, acrylic-based, epoxy-based, and urethane-based resin solutions in the form of polyurethane resins, vinyl acetate, and ethylene vinyl copolymers.

Polarizing film 24 that exploits the polarizing property of a dichroic dye is generally employed. The polarizing property of dichroic dyes is generally realized because dichroic dyes orient themselves uniaxially. Accordingly, as shown in FIG. 5, an orientation film (orientation film 23 in FIG. 5) for uniaxially orienting the dichroic dye is generally provided as the layer beneath a dye film (dichroic dye film).

The orientation film can be formed by depositing a film-forming material by a known film-forming method such as vapor deposition or sputtering, or can be formed by a known coating method such as dipping or spin coating. Examples of suitable film-forming materials are silicon oxides, metal oxides, and complexes and compounds thereof.

An example of the orientation film that is formed by the above coating method is a sol-gel film containing an inorganic oxide sol. Examples of coating liquids that are suitable for forming a sol-gel film are coating liquids containing at a minimum either an alkoxysilane or a hexaalkoxydisiloxane and an inorganic oxide sol. From the perspective of the ease of imparting the function of an orientation film, the alkoxysilane is desirably one that is denoted by general formula (1) below and the hexaalkoxydisiloxane is desirably one that is denoted by general formula (2) below. The coating liquid can contain either an alkoxysilane, a hexaalkoxydisiloxane, or both. As needed, it is also possible to incorporate the alkoxysilane containing a functional group denoted by general formula (3) below.

$$Si(OR^1)_a(R^2)_{4-a} \tag{1}$$

$$(R^3O)_3Si\text{—}O\text{—}Si(OR^4)_3 \tag{2}$$

$$R^5\text{—}Si(OR^6)_b(R^7)_{3-b} \tag{3}$$

Each of $R^1$ in general formula (1) and $R^3$ and $R^4$ in general formula (2) above independently denotes an alkyl group with 1 to 5 carbon atoms, which may be linear, branched, or cyclic. Specific examples of the alkyl group are: a methyl group, ethyl group, n-propyl group, isopropyl group, n-butyl group, isobutyl group, sec-butyl group, tert-butyl group, pentyl group, and cyclopentyl group. Of these, a methyl group or an ethyl group is desirable.

In general formula (1) above, $R^2$ denotes an alkyl group with 1 to 10 carbon atoms. Specific examples are the alkyl groups with 1 to 5 carbon atoms given by way of example above, a hexyl group, a heptyl group, an octyl group, and a 2-ethylhexyl group. Of these, a methyl group, ethyl, group, propyl group, or butyl group is desirable. In general formula (1) above, a denotes 3 or 4.

In general formula (3), $R^5$ denotes an organic group having one or more functional groups selected from the group consisting of glycidoxy groups, epoxy groups, amino groups, and isocyanate groups. Each of $R^6$ and $R^7$ independently denotes an alkyl group with 1 to 5 carbon atoms, and b denotes 2 or 3. Specific examples of the alkyl group having 1 to 5 carbon atoms are as given above.

An oxide comprised of one or more elements selected from among Mg, Ca, Sr, Ba, Al, In, Ge, Bi, Fe, Cu, Y, Zr, Ni, Ta, Si, and Ti is an example of the inorganic oxide constituting the above inorganic oxide sol. Of these, from the perspectives of ease of manufacturing the microparticulate sol and stability, $SiO_2$, $TiO_2$, $ZrO_2$, $CeO_2$, ZnO, $SnO_2$, and indium tin oxide (ITO) are desirable. Of these, from the perspective of achieving both chemical stability and an increased film hardening effect, a silica sol ($SiO_2$) is desirable. The inorganic oxide sol may contain just one type of inorganic oxide particle, or two or more types. From the perspective of increased film hardness and suppressing haze (fogging) of the film itself, the size of the inorganic oxide particles constituting the inorganic oxide sol is desirably 1 to 100 nm, preferably 5 to 50 nm.

The coating liquid can be prepared by admixing the various above components with various additives such as solvents and catalysts. In the coating liquid, the content of the inorganic oxide sol as a solid component is desirably 0.1 to 60 mol percent, preferably 2 to 55 mol percent, more preferably 15 to 50 mol percent, and still more preferably, 25 to 40 mol percent of the combined solid components of the coating liquid. Within this range, it is possible to form an orientation film of suitable hardness. The contents of the other components can be suitably established taking into account the hardness of the orientation film, adhesion to other films such as the polarizing film, and the like. For example, denoting the inorganic oxide sol as "component (A)," the alkoxysilane denoted by general formula (1) and the hexaalkoxydisiloxane denoted by general formula (2) collectively as "component (B)," and the alkoxysilane containing a functional group denoted by general formula (3) as "component (C)," from the perspectives of the hardness of the orientation film and adhesion to other films, the proportion of component (B) is desirably 40 to 99.9 mol percent, preferably 45 to 90 mol percent, more preferably 50 to 80 mol percent, and still more preferably 60 to 75 mole percent, of the combined molar quantity of the solid component of component (A) and component (B). The mol ratio ((B)/(A) (solid component)) of component (B) to the solid component of component (A) is desirably 99.9/0.1 to 40/60, preferably 90/10 to 45/55, more preferably 80/20 to 50/50, and still more preferably, 75/25 to 60/40. Further, the mol ratio of the combined quantity of the solid component of component (A) and component (B) to component (C), (((A) (solid component)+(B))/(C)), is desirably 99.0/0.1 to 85/15, preferably 98/2 to 85/15.

In the orientation film, a step of forming grooves in a certain direction is implemented following film formation. When a coating liquid containing a dichroic dye is coated on the surface of the orientation film in which grooves have been formed in this step, the dichroic dye aligns with the grooves, or orients itself in a direction orthogonal to the grooves. Thus, the dichroic dye can be uniaxially oriented and the polarizing property thereof can be properly achieved. The grooves are formed, for example, by a polishing process employing an abrasive, or by a rubbing step that is conducted to orient liquid-crystal molecules.

The polarizing film (dichroic dye film) that is formed over the orientation film will be described next.

Dichroic dyes have an elongated molecular shape, and have a property of absorbing a light that oscillates in the longitudinal direction of the dye molecule and transmitting a light in the direction orthogonal to the above direction. Among dichroic dyes, when water is employed as solvent, some are known to exhibit liquid crystal states at certain concentration and temperature ranges. Such liquid crystal states are referred to as lyotropic liquid crystals. By utilizing the liquid crystal states of these dichroic dyes to cause the dye molecules to array themselves in a single specified direction, it is possible to achieve more intense dichroism. By coating a coating liquid containing a dichroic dye on the orientation film in which grooves have been formed, the dichroic dye can be uniaxially oriented and thus the polarizing film with good polarizing property can be formed. Controlling the positional relation of the polarization axis of the polarizing film and the polarization axis of the polarizing element based on Embodiment 1 set forth above makes it possible to measure with high precision the thickness of the individual layers by optical interferometry even when there is considerable refractive index wavelength dispersion due to the effect of the absorption characteristic of the dichroic dye. Further, controlling the positional relation of the polarization axis of the polarizing film and the polarization axis of the polarizing element based on Embodiment 2 set forth above makes it possible to measure with high precision the thickness of the individual layers by optical interferometry even when the refractive index of the polarizing film is close to the refractive index of an adjacent layer.

Dichroic dyes contained in the polarizing film are not specifically limited. Various dichroic dyes employed in common polarizing elements can be used. Examples are azo, anthraquinone, merocyanine, styryl, azomethine, quinone, quinophthalone, perylene, indigo, tetrazine, stilbene, and benzidine dies. The dyes described in U.S. Pat. No. 2,400,877 and Published Japanese Translation (TOKUHYO) No. 2002-527786 of a PCT International Application, which are expressly incorporated herein by reference in their entirety, are further examples.

An eyeglass lens (polarizing lens) has been described above as an example of a laminate suited to application of the measuring method of the present invention. However, the laminate to which the measuring method of the present invention is applied is not limited to an eyeglass lens, and need only contain a polarizing film. For example, the measuring method of the present invention can be applied to liquid-crystal displays. The measuring method of the present invention is suitable for cases where the film of which the thickness is to be measured is a thin film of equal to or less than 5 µm in thickness, more particularly, a thin film of 0.1 to 1 µm in thickness.

A further aspect of the present invention relates to a method of manufacturing an eyeglass lens of multilayered structure having plural films including a polarizing film, comprising:

after forming two or more layers of films comprising at least a polarizing film in a laminating step of forming the plural films, or after the laminating step, measuring a thickness of one or more of the films included in a laminate that has been formed by the above method of measuring a thickness of a film;

in case that the film thickness that has been measured falls outside a predetermined measurement range, conducting a film thickness adjusting step; and not conducting the film thickness adjusting step when the film thickness that has been measured falls within the predetermined reference range.

In one embodiment, the film thickness adjusting step is a step in which the film that has been formed is removed and a new film is formed. In another embodiment, the film thickness adjusting step is a step in which the thickness of the film that has been formed is changed. Based on the measurement value, as needed, the film is either formed anew or the film thickness is changed. This can provide an eyeglass lens of desired film thickness.

The details of the laminating step in the method of manufacturing an eyeglass lens of the present invention are as set forth above. Reference can be made to paragraphs [0011] to [0038] and Examples described in Japanese Unexamined Patent Publication (KOKAI) No. 2009-237361, which is expressly incorporated herein by reference in its entirety, with regard to the process of manufacturing an eyeglass lens including a laminating step.

The film thickness measurement in the method of manufacturing an eyeglass lens of the present invention is conducted at least after forming the polarizing film, but does not have to be conducted after forming all films (functional films) constituting the eyeglass lens. The measuring method of the present invention permits the high precision measurement of film thickness in a laminate containing at least a polarizing film. Thus, in one embodiment, the measuring method of the present invention is used to measure the film thickness at least after forming two or more films including a polarizing film in the laminating step. It is also possible to measure the film thickness after forming all of the films. Thus, the embodiment where film thickness measurement is conducted after the laminating step is also covered by the method of manufacturing an eyeglass lens of the present invention.

The details of film thickness measurement in the method of manufacturing an eyeglass lens of the present invention are as set forth for the measuring method of the present invention. The film that is measured is comprised of at least one layer, but it is also possible to measure the thickness of plural films (and adjust the thickness thereof as needed). In the method of manufacturing an eyeglass lens of the present invention, so long as the film thickness that is measured falls within a predetermined reference range, the manufacturing process can be continued to obtain a finished lens. Additionally, when the film thickness that is measured falls outside the predetermined reference range, a film thickness adjusting step is conducted to achieve the desired film thickness.

When the film thickness that has been measured falls below the predetermined reference range, the film thickness adjusting step desirably consists of reforming a film over the film that has been formed (by coating a coating liquid, for example) to increase the thickness of the film. Additionally, when a film is formed to a thickness exceeding the predetermined reference range, it is desirable to remove a portion of the film that has been formed or remove the film that has been formed and form a new film. The film that has been formed can be removed by, for example, dissolving part or all of the film with a solvent.

Following film thickness adjustment, the manufacturing process can be continued to obtain a finished lens, or the film thickness can be measured again to confirm that a film of desired thickness has been formed before sending off the finished lens. The latter embodiment is desirable in terms of shipping finished lenses that conform to design values. When remeasurement of the film thickness reveals that the reference range has again been missed, it is desirable to conduct the film thickness adjusting step anew.

As set forth above, the method of manufacturing an eyeglass lens of the present invention makes it possible to ship finished lenses in which the formation of films of desired thickness has been confirmed. Thus, it is possible to prevent defective film thickness in the finished lenses. This can lower the defective product rate, which is advantageous from the perspective of manufacturing costs and the burden on the environment. That is, the method of manufacturing an eyeglass lens of the present invention can reduce costs and the environmental burden during polarizing lens manufacturing.

EXAMPLES

The present invention will be described in greater detail below through Examples. However, the present invention is not limited to Examples.

A. Example and Comparative Example of Film Thickness Measurement (Embodiment 2)

1. Fabricating a Polarizing Lens
(1) Preparing a Coating Liquid for the Orientation Layer
To 4.9 g of silica sol (methanol solvent, solid component 30 weight percent, average primary particle diameter 12 nm) were sequentially added 29.2 g of ethanol, 10.4 g of tetraethoxysilane (TEOS) (molecular weight 208.3), and 2.1 g of γ-glycidoxypropyl trimethoxysilane (γ-GPS) and the mixture was stirred. Next, 2.9 g of 0.01 mol/L of hydrochloric acid (18.4 mol percent of the total coating liquid) was added and the mixture was stirred. To this was added 0.5 g (0.18 mol percent of the total coating liquid) of an aluminum catalyst (aluminum acetylacetonate) and the mixture was thoroughly stirred. The mixture was passed through a 0.5 μm filter to obtain an orientation layer coating liquid.

(2) Forming an Orientation Film

A polyurethane urea lens (a product called Phoenix made by HOYA Corporation, refractive index 1.53, equipped with hard coat, 70 mm in diameter, base curve 4) was employed as the lens substrate. The orientation layer coating liquid prepared in (1) above was spin coated (fed at 800 rpm and held for 60 s) on the hard coat of the convex surface of the lens substrate and thermoprocessing was conducted for 1 h at 85° C. to cure the film, forming an orientation film (sol-gel film). An abrasive material in the form of abrasive-containing urethane foam (abrasive: alumina $Al_2O_3$ grains with an average particle diameter of 0.1 to 5 μm; urethane foam: of roughly the same shape as the curvature of the convex surface) was employed in a polishing process to form grooves. The polished lens was washed with pure water and dried.

(3) Forming a Polarizing Film

A 2 to 3 g quantity of an about 5 weight percent aqueous solution of dichroic dye (product name "Varilight Solution 2S" made by Sterling Optics, Inc.) was spin coated on the convex lens surface following (2) above to form a polarizing film. The spin coating consisted of feeding the aqueous solution of the dye at a rotational speed of 300 rpm held for 8 s; feeding at a rotational speed of 400 rpm held for 45 s; and feeding at 1,000 rpm held for 12 s. Next, an aqueous solution of pH 3.5 with an iron chloride concentration of 0.15 M and a calcium hydroxide concentration of 0.2 M was prepared. The lens obtained above was immersed for about 30 s in the aqueous solution, withdrawn, and thoroughly rinsed in pure water. This step (insolubilization) was used to render the dye insoluble in water. This step is also referred to as water insolubilization. It is an effective step for increasing the stability of the film. To increase film stability and film strength, following insolubilization, a dichroic dye immobilizing treatment (the forming of a protective layer to immobilize the dye) can be conducted. Following the immobilization treatment, the protective layer is essentially integrated with the polarizing film. A specific example of the immobilizing treatment is given below.

Following the above insolubilization, the lens was immersed for 15 minutes in a 10 weight percent aqueous solution of γ-aminopropyl triethoxysilane, washed three times with pure water, thermoprocessed for 30 minutes in a heating furnace (internal temperature 85° C.), and then removed from the furnace and cooled to room temperature. Following cooling, the lens was immersed for 30 minutes in a 2 weight percent aqueous solution of γ-glycidoxypropyl trimethoxysilane. Following the above immobilization process, the lens was thermoprocessed for 30 minutes in a heating furnace (internal temperature 60° C.), removed from the furnace, and cooled to room temperature.

Paragraphs [0035] and [0036] and Examples of Japanese Unexamined Patent Publication (KOKAI) No. 2009-237361 provide specifics of the water insolubilization treatment and immobilization treatment. The above treatments can be conducted by consulting these descriptions in the present invention.

(4) Forming a Primer

Four weight parts of UV-curable resin (make by Adeka, product name "Adeka Bontiter HUX") were diluted with 100 weight parts of propylene glycol monomethyl ether (PGM). The solution obtained was filtered with a 0.5 μm filter to obtain a coating composition. The coating composition was spin coated (1,000 rpm held for 30 s) on both surfaces of the lens obtained in (3). Following coating, curing was conducted under conditions of 60° C. for 30 min. to form a primer.

(5) Forming a Hard Coat

A hard coat was formed on both surfaces of the lens over the primer formed in (4) above by the method set forth below.

Ten weight parts of Kayarad DPCA-20 made by Nippon Kayaku Co., Ltd. were diluted with 30 weight parts of ethyl acetate and two weight parts of a photoinitiator (Irgacure 184 made by Ciba Specialty Chemicals Corp.). The mixture was coated by spin coating (1,500 rpm held for 30 s). The coating was cured at a UV irradiation level of 60 $J/cm^2$ with a UV irradiating device to form a hard coat film.

Figure 8:
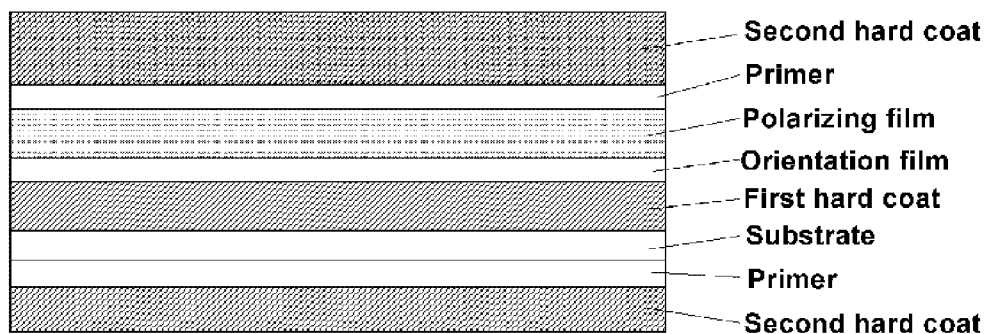
FIG. 8 is a layer structure of a polarizing lens fabricated in Example.

The laminate (polarizing lens) of the layer structure shown in FIG. 8 was obtained by the above steps. In the above process of forming the polarizing lens, the refractive index for omnidirectional light with a wavelength of 546.07 nm was sequentially measured for each layer when the particular layer was positioned on the outermost surface. The refractive index of the polarizing film was 1.496. The refractive index of the adjacent orientation film was 1.465 (difference with refractive index of polarizing film: 0.031). And the refractive index of the primer was 1.510 (difference with refractive index of polarizing film: 0.014).

2. Measuring Spectral Reflectance Spectra

Figure 9:
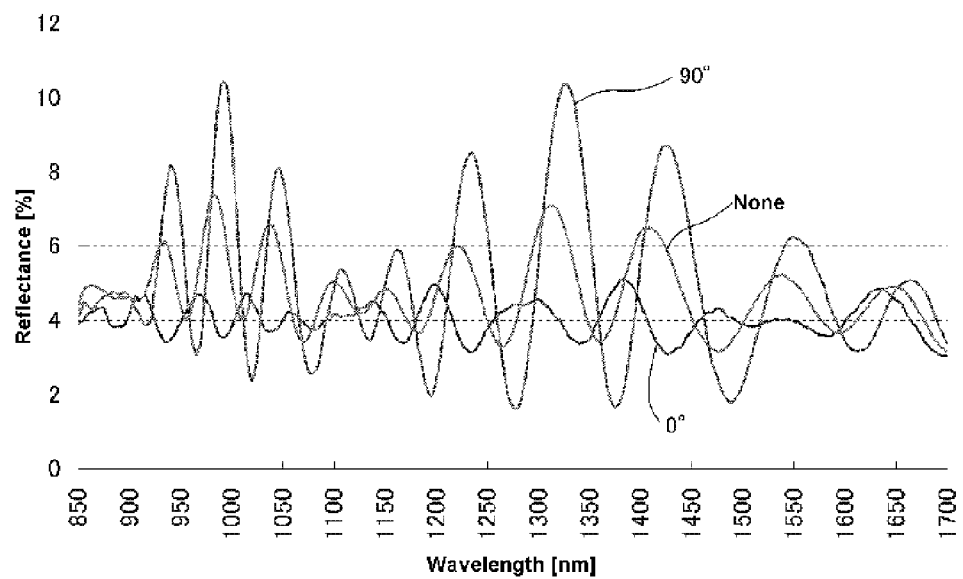
FIG. 9 is spectral reflectance spectra obtained in Example and Comparative Example.

The spectral reflectance spectrum of the polarizing lens fabricated in 1. above was measured with the measuring device schematically shown in FIGS. 1 and 2. The measurement was conducted with a compound beam having a continuous wavelength band in the near infrared region. With filter 11 in place, a polarizing element was disposed between the light emission element and polarizing lens. FIG. 9 shows the spectral reflectance spectra measured for the following states: (i) without filter 11; (ii) with the polarization spectral of the polarizing element contained in filter 11 parallel to the polarization axis contained in the polarizing lens; (iii) with the polarization axis of the polarizing element contained in filter 11 orthogonal to the polarization axis contained in the polarizing lens.

3. Calculating Film Thickness from Spectral Reflectance Spectra

The closest profile match from among the theoretical reflectance profiles derived from the physical models of films were determined by curve fitting by the method (curve fitting method) described in paragraphs [0079] to [0086] in Japanese Unexamined Patent Publication (KOKAI) No. 2003-114107 for the various spectral reflectance spectra obtained in 2. above. The film thickness of the orientation film and polarizing film were obtained from a model established on that basis. Table 1 shows the film thicknesses of the orientation film and polarizing film determined from the spectral reflectance spectra obtained in states (i) to (iii) above. The reference values given in Table 1 are the thicknesses of the various layers as measured by transmission electron microscopy (TEM).

TABLE 1

| | Reference value (actual measurement value by TEM) | (i) No polarizing element present | (ii) Parallel polarization axes | (iii) Orthogonal polarization axes |
|---|---|---|---|---|
| Orientation film | 186 nm | 170 nm | Measurement was impossible. | 170 nm |
| Polarizing film | 997 nm | 1102 nm | Measurement was impossible. | 1026 nm |

As shown in FIG. 9, compared to the absence of a polarizing element, "(ii) Parallel polarization axes" exhibited a low amplitude of the spectral reflectance spectrum and "(iii) Orthogonal polarization axes" exhibited a high spectral reflectance spectrum. By controlling the positional relation between the polarization axis of the polarizing film and the polarization axis of the polarizing element based on these results, it was possible to confirm that the amplitude of the spectral reflectance spectra could be increased. As shown in Table 1, in "(iii) Orthogonal polarization axes" in which the amplitude of the spectral reflectance spectrum was large, the calculated value of the thickness of the polarizing film and the calculated value of the thickness of the adjacent orientation film were both equivalent to the actually measured values. By contrast, in "(i) No polarizing element present", there was considerable error between the calculated thickness of the polarizing film and the actually measured value and measurement precision was low. In "(ii) Parallel polarization axes", the various individual layers could not be identified, precluding thickness measurement.

The above results indicated that by controlling the positional relation between the polarization axis of the polarizing film and the polarization axis of the polarizing element so that the amplitude of the spectral reflectance spectra increased, when there was little difference between the refractive indexes of the polarizing film and the adjacent film, it was possible to highly reliably calculate the thickness of the various layers by optical interferometry. As shown in FIG. 9, the energy reflectance R of the light exhibited multiple maxima and minima as the wavelength λ of the measurement beam changed, exhibiting periodic change based on the film thickness. Denoting the number of maxima (or minima) present between a wavelength λa at which one maximum (or minimum) on the short wavelength side was exhibited and a wavelength λb at which another maximum (or minimum) on the long wavelength side was exhibited as N, denoting the thickness of the film being measured as d, and denoting the refractive index as n, film thickness d is known to satisfy equation (4) below.

$$d = \frac{N+1}{2n} \times \frac{\lambda a \times \lambda b}{\lambda b - \lambda a} \quad (4)$$

The refractive index that was calculated by substituting the calculated film thickness and the results shown in FIG. 9 into equation (4) was 1.670 for the polarizing film. As set forth above, the refractive index of the polarizing film for omnidirectional light in the visible light range was 1.496. Thus, controlling the positional relation between the polarization axes as set forth above made it possible to increase the refractive index of the polarizing film, and as a result, the precision of the film thickness calculated by optical interferometry was thought to have been increased in the case where there was a small difference in the refractive indexes of the polarizing film and the adjacent film in omnidirectional light in the visible light region.

B. Example and Comparative Examples of Film Thickness Measurement (Embodiment 1)

1. Fabricating a Polarizing Lens

Figure 6:
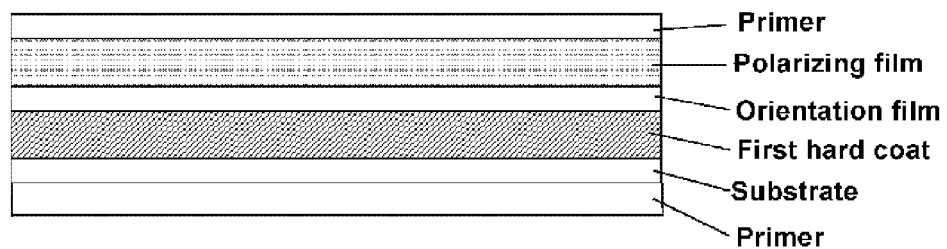
FIG. 6 is a layer structure of a polarizing lens fabricated in Example.

A laminate (polarizing lens) having the layer structure shown in FIG. 6 was obtained by changing the coating liquid for forming a polarizing film in the above Example of Embodiment 2 and not forming a hard coat layer after forming the primer. The difference in refractive index with the adjacent layer was always equal to or more than 0.1 when the refractive index for omnidirectional light with a wavelength of 546.07 nm of each layer was measured with each layer positioned on the outermost surface in the process of forming the polarizing lens.

2. Measuring Spectral Reflectance Spectra

Figure 7:
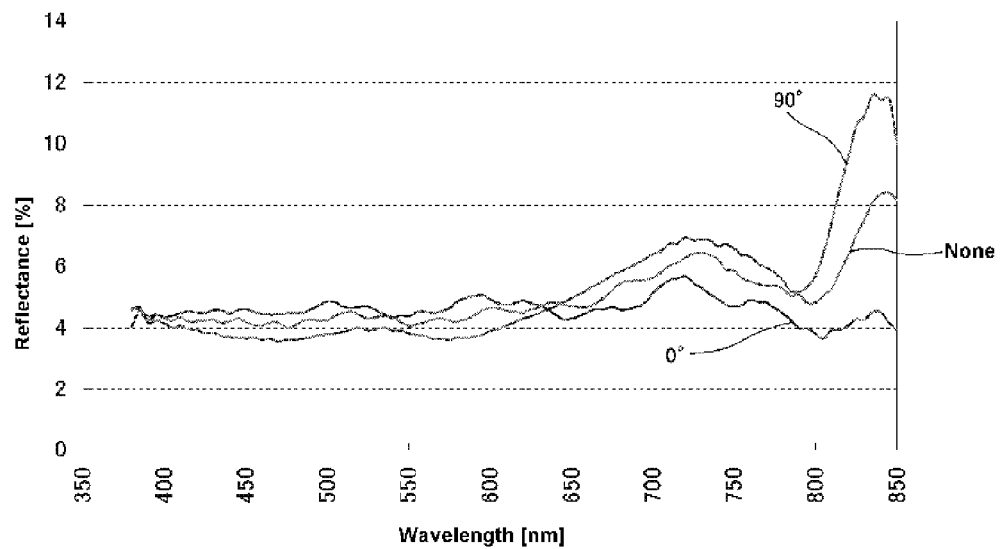
FIG. 7 is spectral reflectance spectra obtained in Example and Comparative Examples.

The spectral reflectance spectrum of the polarizing lens fabricated in 1. above was measured with the measuring device schematically shown in FIGS. 1 and 2. The measurement was conducted with a compound beam having a continuous wavelength band in the visible light region. With filter 11 in place, a polarizing element was disposed between the light emission element and the polarizing lens. FIG. 7 shows the spectral reflectance spectra measured for the following states: (i) without filter 11; (ii) with the polarization axis of the polarizing element contained in filter 11 parallel to the polarization axis contained in the polarizing lens; (iii) with the polarization axis of the polarizing element contained in filter 11 orthogonal to the polarization axis contained in the polarizing lens.

3. Calculating Film Thickness from Spectral Reflectance Spectra

The closest profile match from among the theoretical reflectance profiles derived from the physical models of films were determined by curve fitting by the method (curve fitting method) described in paragraphs [0079] to [0086] in Japanese Unexamined Patent Publication (KOKAI) No. 2003-114107 for the various spectral reflectance spectra obtained in 2. above. The film thickness of the orientation film and polarizing film were obtained from a model established on that basis. Table 1 shows the film thicknesses of the orientation film and polarizing film determined from the spectral reflectance spectra obtained in states (i) to (iii) above. The reference values given in Table 2 are the thicknesses of the various layers as measured by transmission electron microscopy (TEM).

TABLE 2

| | Reference value (actual measurement value by TEM) | (i) No polarizing element present | (ii) Parallel polarization axes | (iii) Orthogonal polarization axes |
|---|---|---|---|---|
| Orientation film | 186 nm | Measurement was impossible. | 170 nm | Measurement was impossible. |
| Polarizing film | 997 nm | Measurement was impossible. | 1050 nm | Measurement was impossible. |

As shown in FIG. 7, compared to the absence of a polarizing element, "(ii) Parallel polarization axes" exhibited a low amplitude of the spectral reflectance spectrum and "(iii) Orthogonal polarization axes" exhibited a high spectral reflectance spectrum. As shown in Table 2, in "(ii) Parallel polarization axes" in which the amplitude of the spectral reflectance spectra was small, the calculated value of the thickness of the polarizing film and the calculated value of the thickness of the adjacent orientation film were both equivalent to the actually measured values. By contrast, in "(i) No polarizing element present" and in "(iii) Orthogonal polarization axes" the refractive index wavelength dispersion of the polarizing film was large and analysis was difficult, precluding the calculation of the thickness of individual films.

The above results indicated that by controlling the positional relation between the polarization axis of the polarizing film and the polarization axis of the polarizing element so that the amplitude of the spectral reflectance spectra decreased, it was possible to highly reliably calculate the thickness of the various layers by optical interferometry even with considerable refractive index wavelength dispersion in the polarizing film (dye film).

C. Example Relating to Manufacturing an Eyeglass Lens (1)

Figure 10:
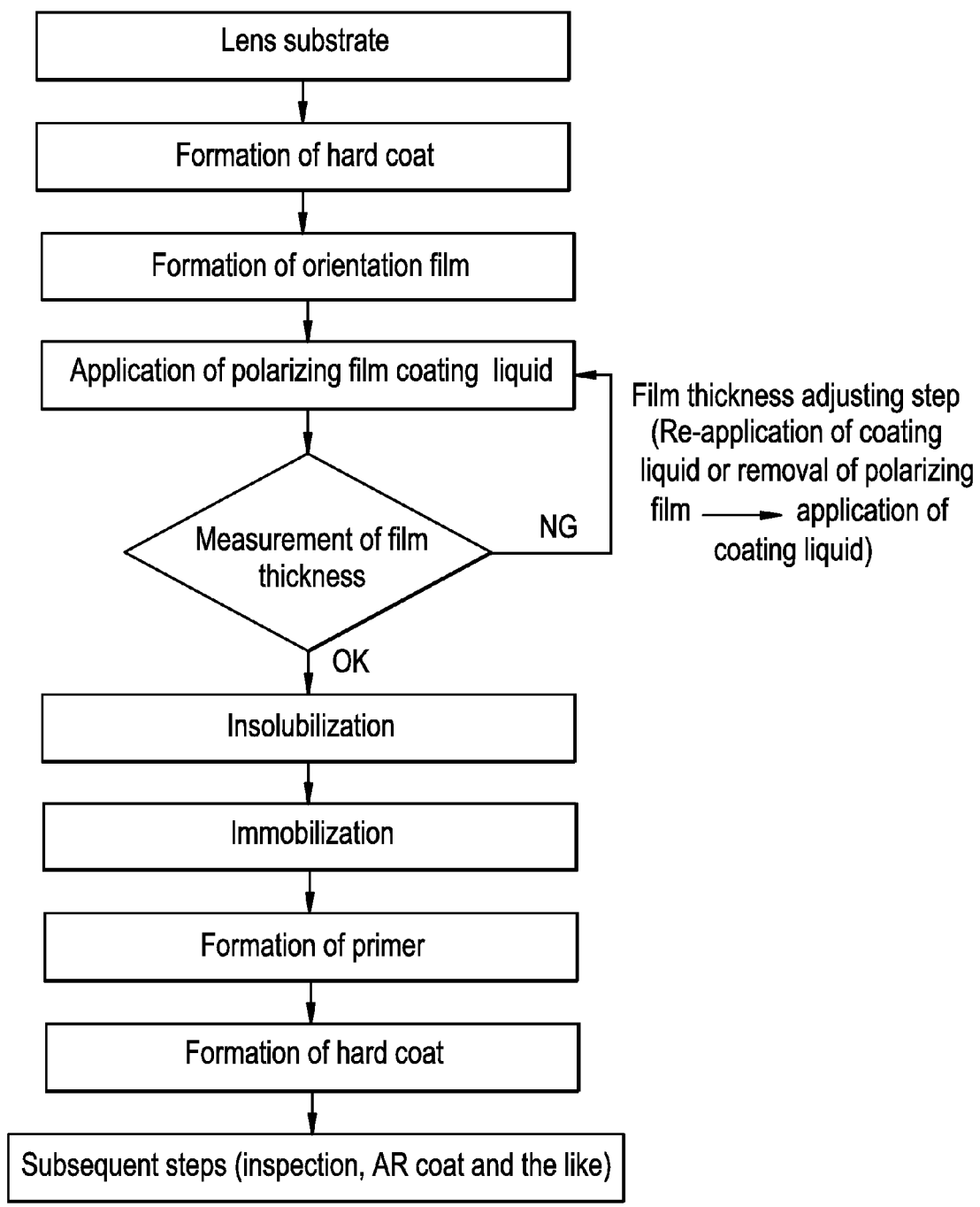
FIG. 10 is a process flow in Example relating to the manufacturing of an eyeglass lens.

With the exception that immobilization processing was conducted based on the above specific example and a hard coat was formed over the primer by the same method as in Example of Embodiment 2, a large number of polarizing lenses were produced by forming the various layers of a polarizing lens by the same methods as in Example of Embodiment 1. In quantity production, as shown in FIG. 10, the thickness of the polarizing film was measured by the same method as in Example of Embodiment 1 (with parallel polarization axes) following application of the polarizing film coating liquid. When the thickness of the polarizing film was within a range of (the design value ±10 percent), the insolubilization and the following step were then conducted to obtain finished lenses. When the thickness of the polarizing film was less than (the design value −10 percent), additional polarizing film coating liquid was applied and the film thickness was measured again. After confirming that the film thickness was within the range of (the design value ±10 percent), the insolubilization and the following steps were conducted to obtain finished lenses. Conversely, when the thickness of the polarizing film exceeded (the design value +10 percent), solvent was applied to remove the polarizing film. Subsequently, the polarizing film coating liquid was applied anew and the film thickness was remeasured. After confirming that the film thickness was within the range of (the design value ±10 percent), the insolubilization and the following steps were conducted to obtain finished lenses.

Measuring the film thickness with the film being measured on the outermost surface in the manner of the present Example is advantageous in that adjustment is easy when film thickness adjustment becomes necessary. Further, measuring the film thickness before insolubilization in the manner of the present Example is advantageous in that removal is easy when removing the polarizing film to adjust the film thickness.

D. Example Relating to Manufacturing an Eyeglass Lens (2)

Figure 11:
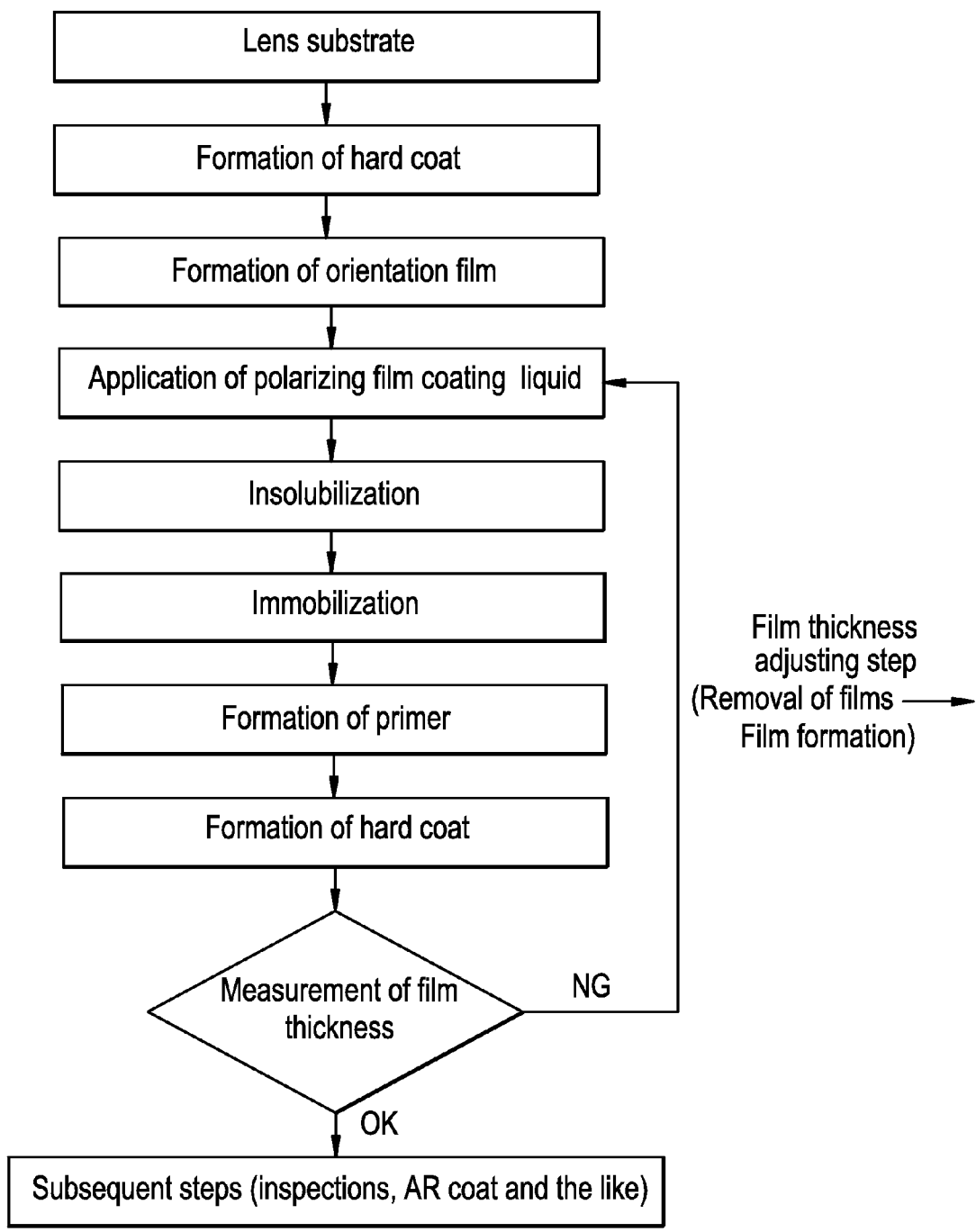
FIG. 11 is a process flow in Example relating to the manufacturing of an eyeglass lens.

With the exception that immobilization processing was conducted based on the above specific example and a hard coat was formed over the primer by the same method as in Example of Embodiment 2, a large number of polarizing lenses were produced by forming the various layers of a polarizing lens by the same methods as in Example of Embodiment 1. In quantity production, as shown in FIG. 11, the thickness of the polarizing film was measured by the same method as in Example of Embodiment 1 (with parallel polarization axes) after forming the hard coat. When the thickness of the polarizing film was within a range of (the design value ±10 percent), the subsequent manufacturing steps (various inspections and the formation of an antireflective film (AR coat)) were conducted to obtain finished lenses. When the thickness of the polarizing film was outside the range of (the design value ±10 percent), layers from the polarizing film to the hard coat were stripped by processing with a solvent and film formation was conducted anew. Subsequently, the thickness of the film was again measured. Once the thickness of the polarizing film had been confirmed to be within the range of (the design value ±10 percent), the subsequent steps were conducted to obtain finished lenses.

E. Example Relating to Manufacturing an Eyeglass Lens (3)

With the exception that immobilization processing was conducted based on the above specific example, a large number of polarizing lenses were produced by forming the various layers of a polarizing lens by the same methods as in Example of Embodiment 2. In quantity production, as shown in FIG. 10, the thickness of the polarizing film was measured by the same method as in Example of Embodiment 2 (with orthogonal polarization axes) following application of the polarizing film coating liquid. When the thickness of the polarizing film was within a range of (the design value ±10 percent), the insolubilization and the following step were then conducted to obtain finished lenses. When the thickness of the polarizing film was less than (the design value −10 percent), additional polarizing film coating liquid was applied and the film thickness was measured again. After confirming that the film thickness was within the range of (the design value ±10 percent), the insolubilization and the following steps were conducted to obtain finished lenses. Conversely, when the thickness of the polarizing film exceeded (the design value +10 percent), solvent was applied to remove the polarizing film. Subsequently, the polarizing film coating liquid was applied anew and the film thickness was remeasured. After confirming that the film thickness was within the range of (the design value ±10 percent), the insolubilization and the following steps were conducted to obtain finished lenses.

F. Example Relating to Manufacturing an Eyeglass Lens (4)

With the exception that immobilization processing was conducted based on the above specific example, a large number of polarizing lenses were produced by forming the various layers of a polarizing lens by the same methods as in Example of Embodiment 2. In quantity production, as shown in FIG. 11, the thickness of the polarizing film was measured by the same method as in Example of Embodiment 2 (with orthogonal polarization axes) after forming the hard coat. When the thickness of the polarizing film was within a range of (the design value ±10 percent), the subsequent manufacturing steps (various inspections and the formation of an antireflective film (AR coat)) were conducted to obtain finished lenses. When the thickness of the polarizing film was outside the range of (the design value ±10 percent), layers from the polarizing film to the hard coat were stripped by processing with a solvent and film formation was conducted anew. Subsequently, the thickness of the film was again measured. Once the thickness of the polarizing film had been confirmed to be within the range of (the design value ±10 percent), the subsequent steps were conducted to obtain finished lenses.

The defective product rate can be reduced by measuring the film thickness in the manufacturing process in the manner of the above Examples.

The present invention is suitable for use in manufacturing of polarizing lenses.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A method of manufacturing an eyeglass lens of multi-layered structure having plural films including a polarizing film, comprising:
    after forming two or more layers of films comprising at least a polarizing film in a laminating step of forming the plural films, or after the laminating step, measuring a thickness of one or more of the films included in a laminate that has been formed;
    in case that the film thickness that has been measured falls outside a predetermined measurement range, conducting a film thickness adjusting step in which the film that has been formed is removed and a new film is formed, or the thickness of the film that has been formed is changed; and
    not conducting the film thickness adjusting step when the film thickness that has been measured falls within the predetermined reference range, wherein
    the measuring of a film thickness comprises:
    a reflection spectrum measuring step in which a reflection spectrum is obtained by irradiating the laminate with a measurement beam and receiving a light reflected from the laminate;
    a film thickness calculating step in which the thickness of the film being measured is calculated based on the reflection spectrum obtained; and
    in the reflection spectrum measuring step, a polarizing element is disposed between an light emission element irradiating the measurement beam, and/or a light-receiving element receiving the reflected light, and the laminate; and
    the polarizing element is disposed so as to change an amplitude of the reflection spectrum obtained relative to an amplitude of a reflection spectrum obtained in a state where the polarizing element is not disposed;
    wherein the polarizing element is disposed so as to increase the amplitude of the reflection spectrum obtained relative to an amplitude of a reflection spectrum obtained in a state where the polarizing element is not disposed, and among films included in the plural films, a difference between a refractive index for omnidirectional light in a visible light region of the polarizing film and that of the film adjacent to the polarizing film is equal to or less than 0.05.

2. The method of manufacturing an eyeglass lens according to claim 1, wherein the polarizing element is disposed so that a polarization axis of the polarizing element is roughly orthogonal to a polarization axis of the polarizing film.

3. The method of manufacturing an eyeglass lens according to claim 1, wherein near infrared light is employed as the measurement beam.

* * * * *